Figure 2:
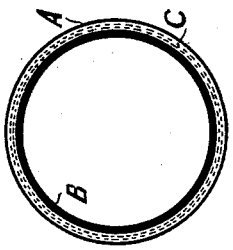

(No Model.) 2 Sheets—Sheet 1.

J. E. HOPKINSON.
HOSE.

No. 489,478. Patented Jan. 10, 1893.

Witnesses
George Walter Whitton
Edward David Baum

Inventor
John Ebenezer Hopkinson
per
Victor Isidore Feeny
Attorney (No Model.) 2 Sheets—Sheet 2.
J. E. HOPKINSON.
HOSE.
No. 489,478. Patented Jan. 10, 1893.
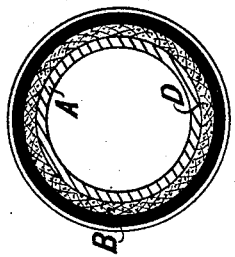
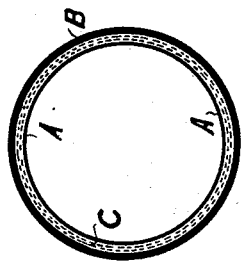
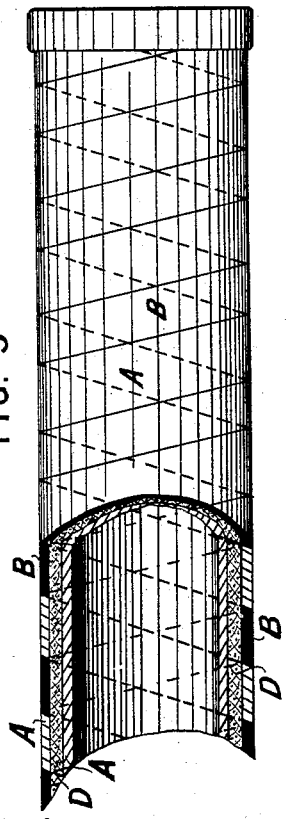
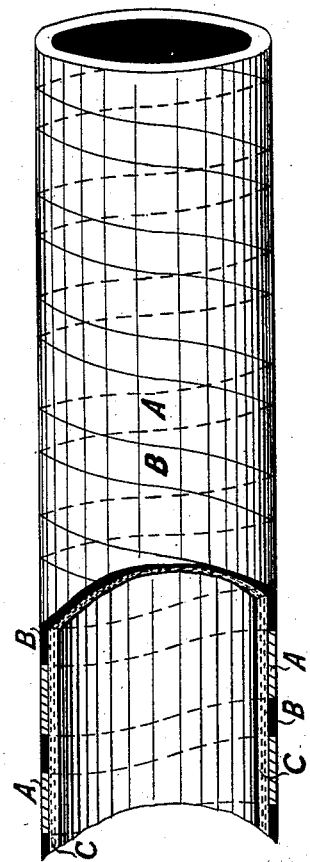
Witnesses.
George Walter Whitton.
Edward David Baum
Inventor
John Ebenezer Hopkinson
per Victor Isidore Feeny
attorney
THE NORRIS PETERS CO., PHOTO-LITHO., WASHINGTON, D. C.

UNITED STATES PATENT OFFICE.

JOHN EBENEZER HOPKINSON, OF LONDON, ENGLAND.

HOSE.

SPECIFICATION forming part of Letters Patent No. 489,478, dated January 10, 1893.

Application filed August 11, 1892. Serial No. 442,824. (No model.) Patented in England February 17, 1892, No. 3,140.

*To all whom it may concern:*

Be it known that I, JOHN EBENEZER HOPKINSON, a subject of the Queen of Great Britain, residing at London, England, have invented certain new and useful Improvements in Flexible Hose or Couplings, (for which I have applied for English Letters Patent No. 3,140, under date of February 17, A. D. 1892,) of which the following is a specification.

My invention has relation to the manufacture of flexible hose adapted for employment in connection with vacuum brakes or pipes and in the conveyance of air, water, gas or other aeriform or gaseous fluids or liquids.

The principal objects of my present invention are first, to provide light, strong, flexible durable, unoxidizable and comparatively inexpensive hose having a smooth interior for conveying air, water or gas, or for other similar purposes; and second, to construct a flexible hose in such manner that it is especially adapted for use in the manufacture of coupling pipes such as are employed in vacuum and pressure brakes and in certain systems of train heating.

According to my invention use is made of a number of hard rubber or vulcanite rings, bands or spirals, or of a covering or ply of asbestus metallic cloth, or of both, for protecting and reinforcing india rubber or canvas tubing or hose.

My invention consists of the improvements in the manufacture of flexible hose hereinafter fully described and claimed.

In carrying my invention into effect rubber hose has suitably applied thereto one or more plies of cotton, jute, hemp or asbestus metallic cloth or the asbestus cloth may be woven in the form of a seamless covering around the surface of the hose and the hard rubber or vulcanite rings or bands of any required form or section applied in parallel rows or any other preferred manner throughout the length of the hose or continuous strips or bands of vulcanite or hard rubber may be employed and applied in spiral or other form either inside or outside of the hose or both inside and outside, if required.

Hose made according to my invention will not only be very light and easy to handle but will be considerably stronger than ordinary wired hose; and moreover, such hose in its finished state will present a perfectly smooth surface throughout both inside and outside and will not be liable or subject to oxidation by exposure to moisture or other atmospheric influences.

Figure 4:
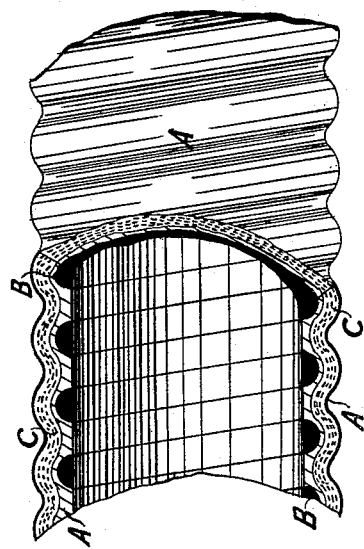
Figure 1:
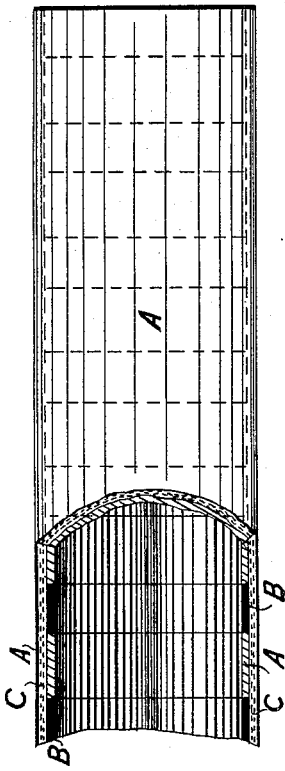
Figure 3:
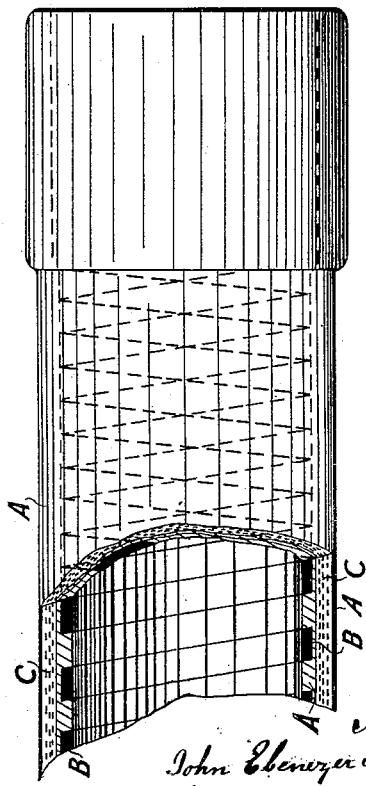

The nature, characteristic features and scope of my invention will be more fully understood from the following description taken in connection with the accompanying drawings forming part hereof; and in which Figure 1, is an elevation partly in section of a hose embodying features of my invention and showing a number of parallel hard rubber or vulcanite rings embedded therein. Fig. 2, is a transverse section taken through the center line of one of the rings illustrated in Fig. 1. Fig. 3, is an elevation partly in section of a hose embodying features of my invention in application to a vacuum brake-pipe and provided with a hard rubber or vulcanite spiral embedded therein. Fig. 4, is an elevation partly in section of a corrugated hose or coupling provided with vulcanite or hard rubber rings embedded therein. Fig. 5, is an elevation partly in section of a hose provided with a hard rubber or vulcanite spiral embedded in the exterior face of the curved wall thereof and having an interior ply of asbestus metallic cloth. Fig. 6, is a transverse section of Fig. 5. Fig. 7, is an elevation partly in section of a hose having a hard rubber or vulcanite spiral embedded in the exterior face of the curved wall thereof; Fig. 8, is a transverse section of Fig. 7.

In the drawings A, is rubber or other flexible tubing.

C, Figs. 1, 2, 3, 4, 7 and 8, is canvas or other tubular insertion for supporting the rubber tubing A. The rubber tubing A, is preferably applied to both the exterior and interior surfaces of the tubular insertion C, as is shown in said figures.

B, is a re-inforcement of hard rubber or vulcanite which may be made up into rings and embedded in the innermost part or portion of the rubber tube A, as illustrated in Figs. 1 and 2. If preferred these rings may be inclined as illustrated in Fig. 4, in order to permit of the corrugation of the finished hose. In some instances the hard rubber or vulcanite B, may be made up into continuous spirals and embedded in the innermost tube A, as illustrated in Fig. 3 or in the outermost tube as illustrated in Figs. 7 and 8. In either case the hard rubber serves to support the rubber tubing A and the insertion C, without deleteriously affecting the smoothness and finish of the inside of the hose.

My invention involves the use of a covering or ply of asbestus cloth D. This ply of asbestus cloth is employed in lieu of the canvas insertion C, and in connection with the hard rubber or vulcanite rings, bands or spirals B, as illustrated in Figs. 5 and 6.

Hose made according to my invention as hereinbefore explained is not only much lighter and stronger than ordinary wired hose, but also presents a perfectly smooth inside surface and is not liable or subject to oxidation or to other deleterious effects superinduced by exposure to moisture, atmospheric or other influences.

Having thus described the nature and objects of my invention what I claim as new and desire to secure by Letters Patent is:—

1. The herein described flexible hose having a uniform internal bore and smooth or plain interior and exterior surfaces and provided with a soft rubber tube and with reinforce rings, bands or spirals of hard rubber embedded in the tube and vulcanized therewith and flush with the surface thereof, substantially as and for the purposes set forth.

2. The herein described flexible hose having a uniform internal bore, a smooth cylindrical exterior surface and provided with a soft rubber tube, a continuous ply of asbestus cloth and reinforce bands, rings or spirals of hard rubber embedded in the rubber tube and made uniform with the interior surface, the construction and arrangement being such that not only interior and exterior smoothness are imparted to the hose but oxidation is obviated in the exposure thereof to moisture or atmospheric influences.

In witness whereof I have hereunto set my signature in the presence of two subscribing witnesses.

JOHN EBENEZER HOPKINSON.

Witnesses:
JOHN HOLMAN,
GEORGE W. NICHOLLS.